United States Patent [19]
Nania

[11] Patent Number: 5,380,062
[45] Date of Patent: Jan. 10, 1995

[54] CHILD'S TILTABLE CAR SEAT

[75] Inventor: Yves Nania, Tignieu Jameyzieu, France

[73] Assignee: Renolux, Charvieu Chavagneux, France

[21] Appl. No.: 79,890

[22] Filed: Jun. 23, 1993

[30] Foreign Application Priority Data

Jun. 30, 1992 [FR] France ................... 92 08291

[51] Int. Cl.⁶ ............................................. B60N 2/28
[52] U.S. Cl. ...................... 297/256.13; 297/329; 248/429
[58] Field of Search ............... 297/256.13, 325, 329; 248/420, 429, 609

[56] References Cited

U.S. PATENT DOCUMENTS

| | | | |
|---|---|---|---|
| 1,961,653 | 6/1934 | Van Deest | 248/429 |
| 3,184,209 | 5/1965 | Colautti | 248/429 |
| 4,709,960 | 12/1987 | Launes | 297/329 X |
| 4,971,392 | 11/1990 | Young | 297/256.13 X |

FOREIGN PATENT DOCUMENTS

| | | |
|---|---|---|
| 0199166 | 10/1986 | European Pat. Off. . |
| 0426585 | 5/1991 | European Pat. Off. . |
| 0447097 | 9/1991 | European Pat. Off. . |
| 2118229 | 1/1978 | Germany .............. 248/429 |
| 8804020 | 7/1988 | Germany . |
| 374462 | 6/1932 | United Kingdom ........ 248/429 |
| 510055 | 7/1939 | United Kingdom ........ 297/329 |
| 829449 | 3/1960 | United Kingdom ........ 248/429 |
| 2139485 | 11/1984 | United Kingdom . |

Primary Examiner—Peter R. Brown
Attorney, Agent, or Firm—Oliff & Berridge

[57] ABSTRACT

A child's tiltable car seat comprises a base intended to be attached to a vehicle seat having a part of a curved slide mounted thereon and a tiltable structure having the other part of the curved slide attached thereto and cooperating with the base part of the curved slide. The base part of the curved slide has a C-shaped cross section, while the part of the curved slide attached to the tiltable structure has an Ω-shaped cross section. The flanges of the Ω-shaped part are able to slide inside grooves delimited by the C-shaped part thus providing a stable assembly.

15 Claims, 3 Drawing Sheets

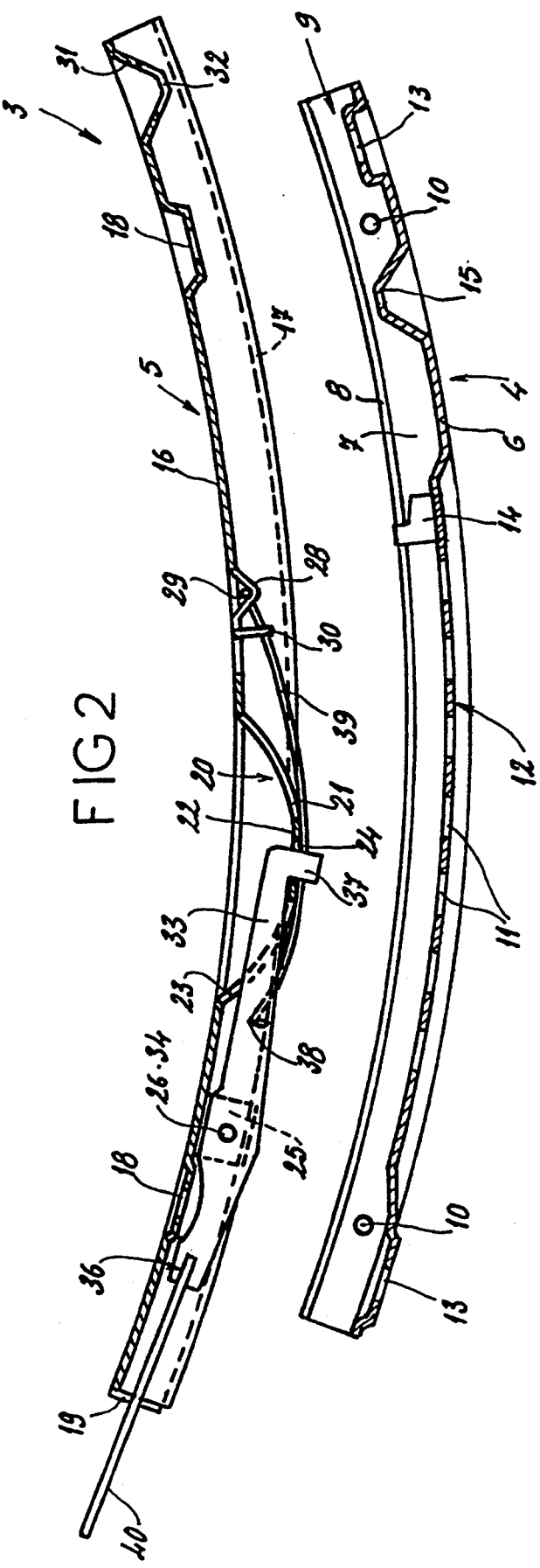

CHILD'S TILTABLE CAR SEAT

BACKGROUND OF THE INVENTION

1. Field of the Invention

The present invention relates to a tiltable car seat for a child.

2. Description of Related Art

A child's car seat has the purpose of providing great safety and great comfort for the child when riding in a vehicle. It is intended to be attached to the seat of a vehicle, generally a rear seat.

A child's car seat must offer a suitable, comfortable position adaptable to the life rhythm of alternating waking and sleeping states. For this purpose, a child's car seat generally includes a base and a tiltable structure.

Typically, the tiltable structure is a shell comprising in particular a bottom, a back, and armrests. The tiltable structure is joined to the base by a curved slide made of two parts, one of which is attached to the shell and the other is mounted on the base. The base is intended to be attached to a vehicle seat.

The relative movement between the two parts of the curved slide allows the tiltable structure to be positioned relative from the base. Hence, a suitable, comfortable position can be offered to a child. However, in general, the slide is narrow so the tiltable structure is not disposed in a stable fashion on the base.

Roller elements, such as balls, are generally interposed between the two parts of the curved slide. These roller elements facilitate relative displacement of the two parts of the slide, but also make installation of the curved slide part lengthy and difficult, increasing the cost of the article.

In order to hold the desired tilted position, a locking-unlocking device allows the tiltable structure to be temporarily immobilized relative to the base. The locking structure is disposed outside the slide, between the tiltable structure and the base. This arrangement is due in particular to the narrowness of the slide. Unfortunately, a risk of injury results from this arrangement. In addition, because of this arrangement, the locking device is complex because it is made up of numerous elements. Assembly and installation is accordingly difficult and, hence, lengthy and expensive.

SUMMARY OF THE INVENTION

A primary object of the present invention is to overcome these disadvantages by offering a child's tiltable car seat with a tiltable structure disposed in a stable fashion on a base. The curved slide parts are easily assembled relative to each other, and the locking device is for the most part located inside the curved slide. Thus, the car seat is easy, fast, and inexpensive to assemble and install.

To achieve the above and other objects, the child's tiltable car seat according to this invention has, on one hand, a base intended to be attached to a vehicle seat and having a part of a curved slide mounted thereon and, on the other hand, a tiltable structure mounted on the base and having the other part of the curved slide. The part of the curved slide mounted on the base has a C-shaped cross section, while the part of the curved slide attached to the tiltable structure has an $\Omega$-shaped cross section. The flanges of $\Omega$-shaped curved slide are able to slide inside grooves delimited by the center part, arms, and bent parts of the C-shaped part. This arrangement allows for relative sliding of the two parts of the slide through a very simple configuration.

Moreover, and very advantageously, a central space is created between the two shapes of the curved slides and accommodates a device that locks the tiltable structure to the base.

To improve the relative sliding between the two parts of the curved slide, while adopting a simple design and decreasing the amount of play, sliding runners are disposed between the $\Omega$-shaped part and the C-shaped part. The runners are accommodated in the grooves of the C-shaped part. Each runner has a lengthwise groove facing the inside of the part, and a flange of the $\Omega$-shaped part slides in the groove. Each runner also has, on its face opposite its groove, at least one stud engaged in a hole provided in one arm of the C-shaped part.

The relative sliding between the two parts of the curved slide tends to displace the sliding runners in the lengthwise direction. The studs engaged in the holes in the arms of the C-shaped shape resist displacement of the runners.

In order to achieve a highly rugged seat while facilitating the relative sliding of the two parts of the curved slide, the sliding runners are made of synthetic material, and the shaped parts are made of metal.

To achieve easy sliding between the two parts of the slide while decreasing the extent of contact between the flanges of the $\Omega$-shaped part and the runners, there are four runners disposed in the lengthwise ends of the C-shaped part. Each runner has a length at least equal to the travel corresponding to the displacement of one part of the slide relative to the other.

To simply adjust the tilt of the tiltable structure, the seat has a rack provided in the center part of the C-shaped part. The rack has a plurality of openings spaced apart from each other in the lengthwise direction, while the $\Omega$-shaped part is provided with a hook articulated around a transverse axis. One end of the hook has a tip designed to engage any of the openings in the rack and is designed to be tilted by a control lever extending from one end of the $\Omega$-shaped part.

By this arrangement, the locking device, which is essentially the hook, its means for articulation and the control lever, is simple in design and largely accommodated in the space between the two parts.

To systematically and securely bring the tip of the hook into an opening of the rack when the control lever is not activated, a wire is provided in the form of a spring. One end of the spring is articulated relative to the web of the $\Omega$-shaped part, and the other end penetrates a transverse hole in the hook. The spring rests between its two ends on a hump in the web of the $\Omega$-shaped part, extending from the outside to the inside of the $\Omega$-shaped part.

The part of the hook located near the tip is introduced into a lengthwise hole made in the hump on which the spring rests. This ensures guidance of the end of the hook, including the tip, into an opening of the rack.

The parts are attached to the corresponding elements of the seat by bolting for a simple design. To perform the respective boltings using only a small number of tools, square holes designed to receive carriage bolts are provided both in the center part of the C-shaped part and in the web of the $\Omega$-shaped part.

At least one of the two parts has at least one projection projecting from the center of the part or web of the part, from the inside to the outside, to retain the carriage bolt during installation. The projection corresponds with the bolt to hold the square part beneath the head of each bolt in a square hole during assembly, if necessary. This arrangement is very useful when there is no obstacle to resist axial displacement of the bolt during installation.

To prevent disengagement between the C-shaped part and the Ω-shaped part, the C-shaped part has a stop projecting from the central part from the outside to the inside of the part near the end of the rack opposite the control lever. The stop of the C-shaped part limits relative displacement of the two parts while serving as an obstacle to elements integral with the Ω-shaped part.

BRIEF DESCRIPTION OF THE DRAWINGS

The invention will be well understood with the aid of the following description referring to the attached drawings, which represent as a nonlimiting example one embodiment of a child's tiltable car seat:

FIG. 2 is a partial cross section of two parts forming the curved side before assembly;

DETAILED DESCRIPTION OF PREFERRED EMBODIMENTS

Figure 1:
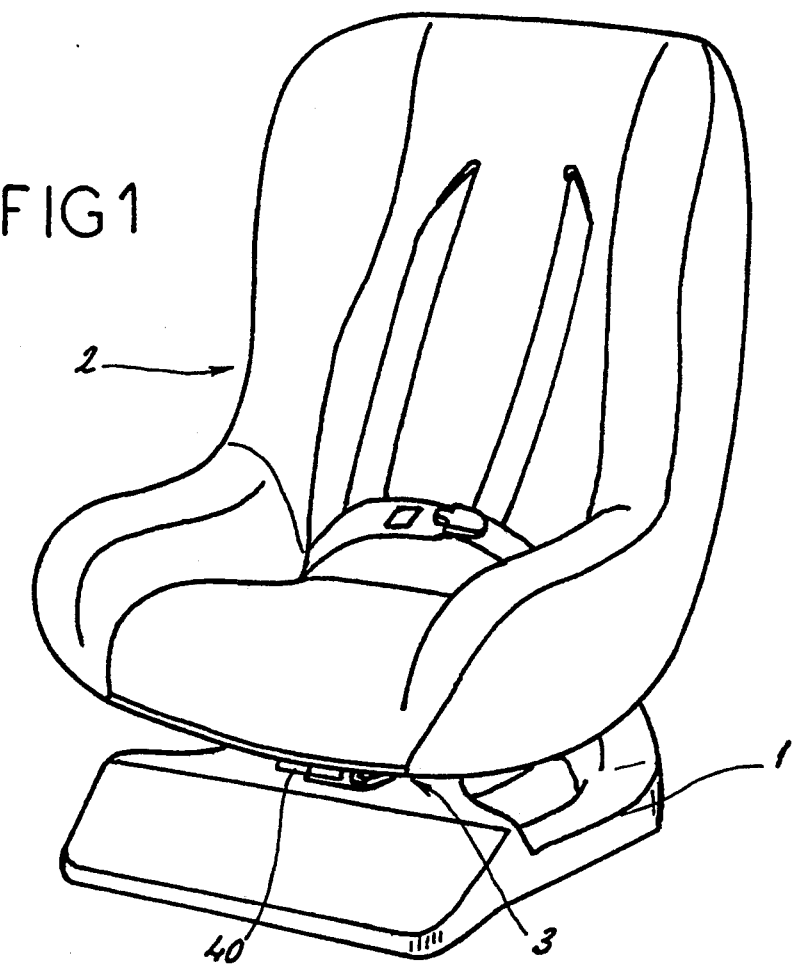
FIG. 1 is a perspective view of the car seat according to this invention.

As shown in FIG. 1, the child's tiltable car seat according to this invention has a base 1 and a tiltable structure 2 including a shell with a bottom, a back, and armrests.

Figure 4:
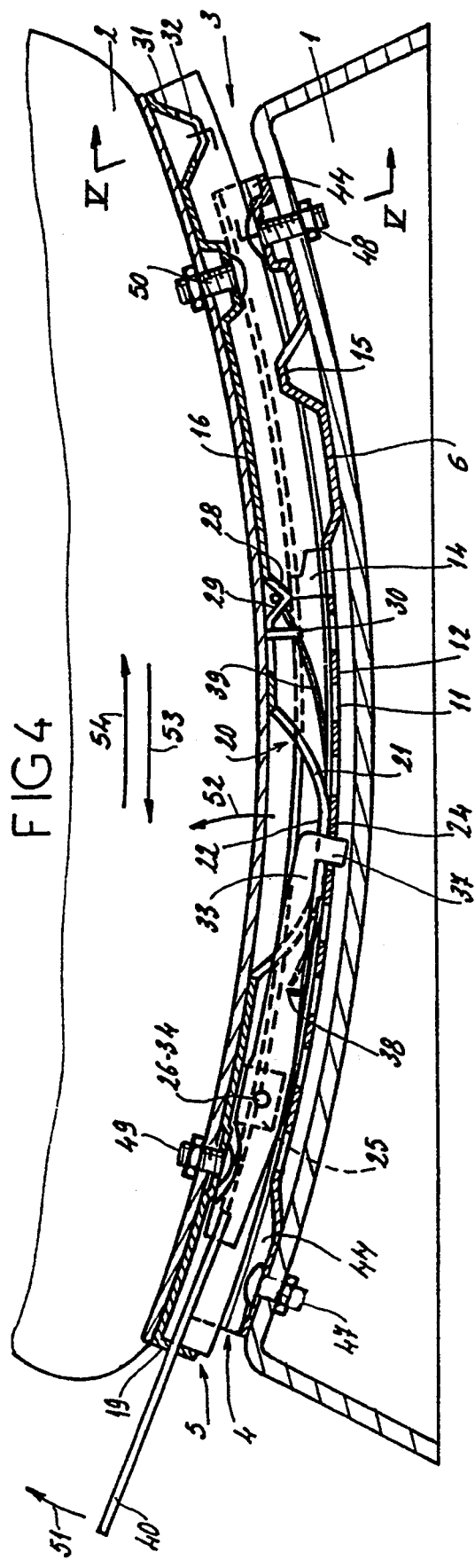
FIG. 4 is a partial side view section of the curved slide, mounted and equipped with the locking device.

A curved slide 3, shown in FIGS. 2 and 4, is disposed between tiltable body structure 2 and base 1 and is oriented from the front to the back of the seat. As shown in FIG. 2, slide 3 includes two curved parts 4 and 5, preferably metal, designed to be joined together.

Figure 5:
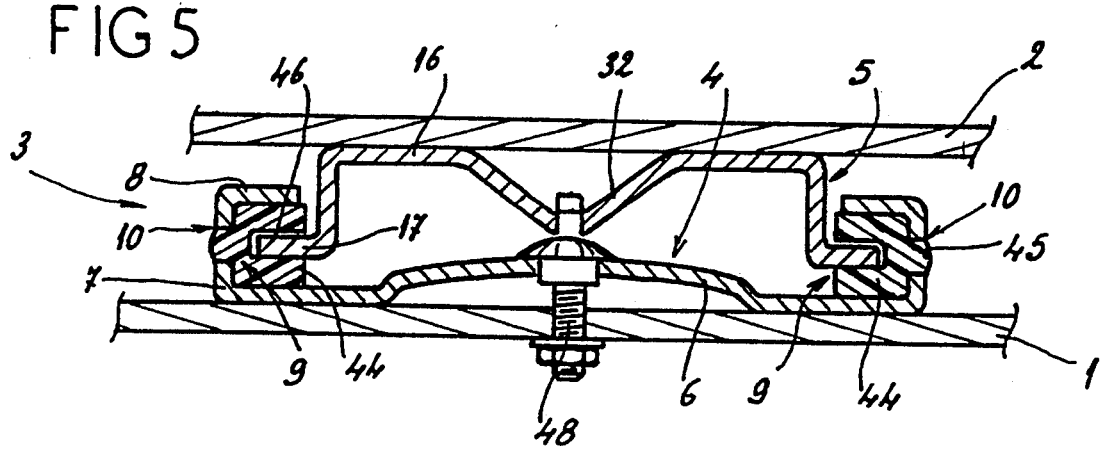
FIG. 5 is enlarged cross sectional view along line V—V in FIG. 4.

Lower slide part 4 has a generally C-shaped cross section, as shown in FIG. 5, and is attached to base 1. It has an indented center part 6, two opposed, generally parallel arms 7, and two bent flanges 8 that define two curved lengthwise facing grooves 9. Preferably, four holes 10 are made in arms 7, with each hole located in an end zone of lower slide part 4. A plurality of holes 11 are provided in center part 6. Holes 11 are spaced apart along the slide to form a rack 12. Square holes 13 are provided in each end zone of lower slide part 4. A stop 14 projects inwardly from center part 6 near one end of rack 12. Stop 14 is cut and bent to form a tongue of center part 6. An inward projection 15 is stamped from center part 6.

Upper slide part 5 is attached to tiltable body structure 2 and is curved inward with the same curvature as lower slide part 4 in the lengthwise direction. Upper slide part 5 has a greater length than lower slide part 4 as shown in FIG. 2. Upper slide part 5 has an Ω-shaped cross section with a generally U-shaped web 16 and two outwardly extending flanges 17, best seen in FIG. 5. Square holes 18 are made in web 16 near each end of upper slide part 5. One longitudinal end of web 16 has an inwardly directed flange 19.

Figure 3:
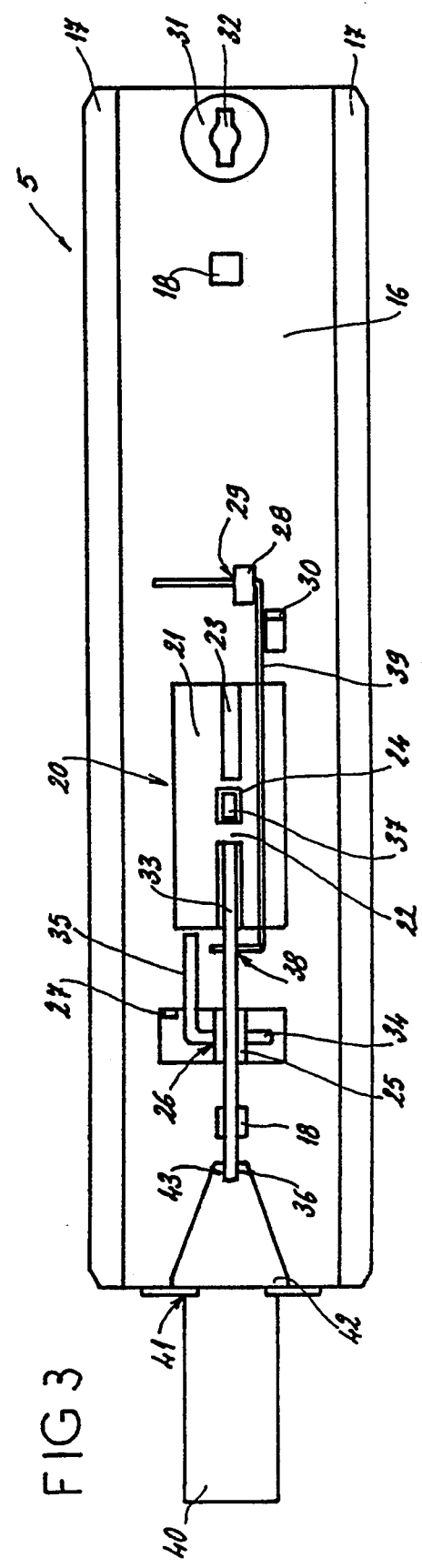
FIG. 3 is a bottom view of the Ω-shaped part equipped with the locking device.

A hump 20, spaced from flange 19, projects inwardly from web 16. As shown in FIG. 3, hump 20 is formed by two curved sheets 21 integral with web 16, parallel to the direction of the slide. Sheets 21 are separated by a space 23 over the greatest part of their length but are connected by two joining parts 22 located near the summit of the hump. There is also an opening 24 at the summit of hump 20.

A fork 25 with two holes 26 is provided between flange 19 and hump 20. This fork 25, and a leg 27 displaced transversely from fork 25, are cut and folded from web 16.

Web 16 has an indentation with a cutout 28 having two openings 29 and projecting inwardly from web 16 near the end of hump 20 opposite fork 25. A finger 30, cut and bent from web 16, projects inwardly near the indentation with cutout 28 but displaced transversely therefrom. An inward projection 31 is provided on web 16 at the end opposite flange 19 and has a lengthwise summit groove 32.

As shown in FIGS. 3 and 4, Ω-shaped slide part 5 is equipped with a hook 33 articulated around the transverse axis of fork 25 by a rod 34 extending between fork holes 26. Rod 34 has an outwardly extending arm 35 disposed between fork 25 and leg 27. The end of hook 33, located near flange 19, has a notch 36, and the other end has an outwardly extending tip 37. A transverse hole 38 is provided in hook 33 between rod 34 and tip 37.

Part of hook 33 located between transverse hole 38 and tip 37 is received in lengthwise hole 23. Tip 37 engages opening 24 at the summit of hump 20. A spring 39, preferably a metal wire, has one end received in transverse hole 38 of hook 33 and the other end received in openings 29 of the indentation of cutout 28. Wire 39 rests on the summit of hump 20 and is disposed between cut out 28 and finger 30.

Upper slide part 5 is also equipped with a control lever 40 that passes through an opening 41 of flange 19, on which it rests with two shoulders 42. Part of control lever 40 extends beyond upper slide part 5, and the other end, located within upper slide part 5, has a cut 43 that cooperates with a notch 36 on hook 33.

As shown in FIGS. 4 and 5, upper Ω-shaped slide part 5 is engaged in lower C-shaped slide part 4, with curved flanges 17 of part 5 fitting inside curved lengthwise grooves 9 of part 4.

Four sliding runners 44, preferably made of synthetic material, are disposed between part 4 and part 5 in the end zones of part 4 as seen in FIGS. 4 and 5. These sliding runners are at least as long as the travel of part 5 relative to part 4 and are accommodated in curved lengthwise grooves 9. Each runner 44 has a stud 45 engaged in hole 10 of arm 7 of part 4 and has a lengthwise groove 46 in which a flange 17 of part 5 is able to slide.

Lower slide part 4 is mounted on base 1 by carriage bolts 47 and 48, each of which has a square part beneath the head accommodated in a square hole 13. Upper slide part 5 is mounted on the tiltable body structure 2 by carriage bolts 49 and 50, each of which has a square part under the head accommodated in a square hole 18.

Mounting of lower slide part 4 on base 1 requires only one wrench because the head of bolt 47 is retained in the axial direction by hook 33 and the head of bolt 48 is retained by projection 31 of upper slide part 5 placed in correspondence. In the same way, it is easy to install upper slide part 5 on tiltable body structure 2 because the head of bolt 49 is retained by hook 33 and the head of bolt 50 is retained by indentation 15 of part 4 placed in correspondence.

The relative arrangement of the child's tiltable car seat elements allows tiltable body structure 2 to be adjusted and held in position, in the lengthwise direction, relative to base 1.

When control lever 40 is not activated, spring 39 biases tip 37 of hook 33 toward the center part 6 of lower slide part 4, and tip 37 engages one of the openings 11 of rack 12. Tip 37, engaged in an opening 11, creates an obstacle to sliding, and, thus, the inclination of tiltable body structure 2 is maintained.

To alter the inclination of the tiltable body structure 2, the outer end of control lever 40 is lifted in the direction of arrow 51 to cause hook 33 to pivot in the direction of arrow 52. Tip 37, moved in the direction of arrow 52, disengages with opening 11. It is then possible to displace tiltable body structure 2 relative to base 1, as long as control lever 40 is lifted.

When control lever 40 is released, spring 39 pushes tip 37 into an opening 11 in rack 12. Hence, control lever 40, hook 33, and spring 39 cooperating with rack 12, constitute a locking-unlocking device.

The sliding of tiltable body structure 2 relative to base 1 is limited in the direction indicated by arrow 53 by the head of bolt 50 contacting stop 14 of slide part 4. In the direction indicated by arrow 54, relative sliding is limited by one of joining parts 22 contacting stop 14.

Alternatively, the slide parts may be reversed with the Ω-shaped part located on the base and the C-shaped part located on the body structure. Also, the locking device may be secured to the slide part on the base and engage the slide part on the body structure if desired.

As can be seen from the foregoing, the invention provides an improvement to the prior art by furnishing a child's tiltable car seat whose tiltable structure is disposed in stable fashion on the base. The curved slide parts are easily assembled relative to each other, and the locking device is largely situated inside the slide. Thus, the seat is easy, fast, and inexpensive to assemble and install.

While advantageous embodiments have been chosen to illustrate the invention, it will be understood by those skilled in the art that various changes and modifications can be made therein without departing from the scope of the invention as defined in the appended claims.

What is claimed is:

1. A seat for a child adapted to be removably attached to a vehicle seat, comprising:
    a base for attachment to a vehicle seat, said base having a first curved slide part;
    a body having a second curved slide part, said first curved slide part and said second curved slide part slidably coupled together to mount said body for tilting with respect to said base,
    wherein said first curved slide part has a generally C-shaped cross section including a center part having a rack formed of a plurality of longitudinally arranged spaced openings, a pair of opposed arms extending from said center part, and a pair of facing flanges each extending from one of said opposed arms, wherein each of said facing flanges, each of said opposed arms and said center part define a groove, and
    wherein said second curved slide part has a generally Ω-shaped cross section including a generally U-shaped web and a pair of flanges extending outwardly therefrom, said outwardly extending flanges being slidingly received in said grooves of said first curved slide part, said second curved slide part also having a control lever extending from an end thereof and a hook with two ends pivotally coupled to said second slide part about a transverse pivot axis, one end of said hook having a tip that engages one of said openings in said rack and the other end being coupled to said control lever, said control lever controlling pivoting of said hook; and
    a spring having two ends, one end pivotally coupled to said second slide part and the other end coupled to said hook, wherein said hook has a transverse hole therein, said other end of said spring engaging said transverse hole, and said one end of said spring pivotally coupled to said web of said second slide part.

2. The seat according to claim 1, further comprising a pair of sliding runners, each runner disposed in one of said grooves and between said first and second curved slide parts.

3. The seat according to claim 2, wherein each runner has a longitudinally extending inwardly facing guide groove that receives one of said outwardly extending flanges of said second curved slide part and at least one stud that engages said first curved slide part.

4. The seat according to claim 3, wherein at least one of said arms of said first curved part has at least one hole therein and said stud engages said hole to prevent relative sliding of said first curved slide part and said runner.

5. The seat according to claim 2, wherein said fist and second slide parts are made of metal and said sliding runners are made of synthetic material.

6. The seat according to claim 2, further comprising another pair of runners, each pair of runners disposed in each longitudinal end of said first slide part, and each runner having a length at least equal to an amount of sliding displacement of one slide part relative to the other slide part.

7. The seat according to claim 1, wherein said second slide part has an inwardly extending hump and said spring rests, between its two ends, on said hump.

8. The seat according to claim 7, wherein said hump has a longitudinally extending hole therein and a portion of said hook adjacent said tip is received in said longitudinally extending hole.

9. The seat according to claim 8, wherein said first slide part includes a stop projecting from said central part that engages with said hump adjacent said longitudinally extending hole.

10. The seat according to claim 1, wherein said first slide part has at least one square hole in said center part and second slide part has at lest one square hole in said web, and further comprising carriage bolts received in said square holes.

11. The seat according to claim 10, wherein at least one of said first and second slide parts has at least one projection that engages at least one of said carriage bolts when said base and said body are aligned.

12. The seat according to claim 1, wherein said first slide part includes a stop projecting from said central part.

13. A child seat for a vehicle, comprising:
    a detachable base having a first longitudinally curved slide part with a center part and opposed inwardly facing side grooves, said center part being coupled to said base, said first slide part having a plurality of longitudinally aligned holes;

a tiltable body structure including a seat and having a second longitudinally curved slide part with a web and outwardly extending opposed flanges, said web being coupled to said body structure and said flanges being slidably engaged in said grooves, said second slide part having a hump extending from said web and a spring; and a locking device including a control lever and a hook secured thereto, said hook being pivotally coupled to said web and said hook and detachably engageable with said first curved slide part, wherein said spring biases said hook toward said openings in said first slide part and said hump has a hole therein receiving said hook and limiting the bias of said spring, and wherein said locking device is selectively and independently engageable with each of said holes for adjusting an inclination of said seat.

14. The child seat of claim 13, further comprising a plurality of runners disposed in said grooves having a longitudinally extending guide groove receiving and guiding said flanges of said second slide part.

15. The child seat of claim 13, wherein one of said first and second slide parts has a stop extending therefrom that engages with the other of said first and second slide parts.

* * * * *